United States Patent
Inaba et al.

(10) Patent No.: US 9,478,780 B2
(45) Date of Patent: Oct. 25, 2016

(54) METHOD FOR PRODUCING RESIN FILM FOR NON-AQUEOUS ELECTROLYTE SECONDARY BATTERY AND RESIN FILM FOR NON-AQUEOUS ELECTROLYTE SECONDARY BATTERY

(71) Applicant: Kureha Corporation, Tokyo (JP)

(72) Inventors: Yusaku Inaba, Tokyo (JP); Tamito Igarashi, Tokyo (JP); Yuki Sakai, Tokyo (JP); Aya Takeuchi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 14/409,561

(22) PCT Filed: Jun. 24, 2013

(86) PCT No.: PCT/JP2013/067217
§ 371 (c)(1),
(2) Date: Dec. 19, 2014

(87) PCT Pub. No.: WO2014/002937
PCT Pub. Date: Jan. 3, 2014

(65) Prior Publication Data
US 2015/0179996 A1     Jun. 25, 2015

(30) Foreign Application Priority Data
Jun. 28, 2012 (JP) ................. 2012-145519

(51) Int. Cl.
*H01M 2/16* (2006.01)
*H01M 2/14* (2006.01)
*H01M 10/0525* (2010.01)
*H01M 10/052* (2010.01)

(52) U.S. Cl.
CPC ........... *H01M 2/145* (2013.01); *H01M 2/1653* (2013.01); *H01M 2/1673* (2013.01);
(Continued)

(58) Field of Classification Search
None
See application file for complete search history.

(56) References Cited

U.S. PATENT DOCUMENTS 6,232,014 B1 * 5/2001 Shiota ............... H01M 2/14
429/137
6,692,543 B1   2/2004 Hamano et al.
(Continued)

FOREIGN PATENT DOCUMENTS

CN   1691367 A    11/2005
JP   H07201316 A   8/1995
(Continued)

OTHER PUBLICATIONS

Sheng-De Li, Cheng-Chien Wang, Chuh-Yung Chen, Preparation and characterization of a novel bipolar membrane by plasma-induced polymerization, Journal of Membrane Science, Mar. 2008, 318(1+2), p. 429-434.
(Continued)

*Primary Examiner* — Yoshitoshi Takeuchi
(74) *Attorney, Agent, or Firm* — Oliff PLC

(57) ABSTRACT

An object of the present invention is to provide a method for producing a resin film for a non-aqueous electrolyte secondary battery that does not inhibit the movement of ions such as lithium ions and that is arranged between a separator and a positive or negative electrode; and a resin film for a non-aqueous electrolyte secondary battery obtained by the production method. The method for producing a resin film for a non-aqueous electrolyte secondary battery comprises the steps of: coating a separator with a resin composition containing a solvent and a vinylidene fluoride copolymer obtained by copolymerizing vinylidene fluoride and a compound represented by formula (1) below (coating step); and drying the separator on which the resin composition has been coated (drying step). In formula (1), $R^1$, $R^2$, and $R^3$ are each independently hydrogen atoms, chlorine atoms, or alkyl groups having from 1 to 5 carbons; and X' is an atomic group having a molecular weight of 472 or less and having a main chain configured from 1 to 19 atoms.

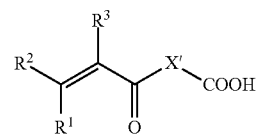

(1)

5 Claims, 3 Drawing Sheets

(52) U.S. Cl.
CPC ....... *H01M10/0525* (2013.01); *H01M 2/1686* (2013.01); *H01M 10/052* (2013.01); *H01M 2220/20* (2013.01); *H01M 2220/30* (2013.01); *Y02T 10/7011* (2013.01)

(56) References Cited

U.S. PATENT DOCUMENTS

| | | | |
|---|---|---|---|
| 2005/0208383 A1 | 9/2005 | Totsuka et al. | |
| 2010/0133482 A1* | 6/2010 | Abusleme | B01D 69/02 252/511 |
| 2013/0273424 A1* | 10/2013 | Watanabe | C09D 127/16 429/217 |

FOREIGN PATENT DOCUMENTS

| | | | | |
|---|---|---|---|---|
| JP | | 3474853 B2 | 12/2003 | |
| JP | | 2005-302341 A | 10/2005 | |
| JP | WO | 2012/090876 | * 7/2012 | ............ C08F 214/22 |
| JP | WO2012090876 | | * 7/2012 | ............ C08F 214/22 |
| JP | | 2012219125 A | 11/2012 | |
| KR | | 2010-0016468 A | 2/2010 | |
| WO | | 2012/090876 A1 | 7/2012 | |

OTHER PUBLICATIONS

International Search Report of PCT/JP2013/067217 dated Jul. 16, 2013.

Dec. 31, 2014 International Preliminary Report on Patentability issued in International Application No. PCT/JP2013/067217.

Jan. 26, 2016 Office Action issued in Chinese Patent Application No. 201380023640.8.

Mar. 23, 2016 Office Action issued in Korean Patent Application No. 10-2014-7031251.

* cited by examiner

METHOD FOR PRODUCING RESIN FILM FOR NON-AQUEOUS ELECTROLYTE SECONDARY BATTERY AND RESIN FILM FOR NON-AQUEOUS ELECTROLYTE SECONDARY BATTERY

TECHNICAL FIELD

The present invention relates to a method for producing a resin film for a non-aqueous electrolyte secondary battery and a resin film for a non-aqueous electrolyte secondary battery.

BACKGROUND ART

Recently, electronic technology has been remarkably developed, and various appliances have been made smaller and lighter. Along with the miniaturization and reduction in weight of electronic appliances, miniaturization and reduction in weight of batteries, serving as power sources of these electronic appliances, have been demanded. As batteries that have small volume and mass but are capable of providing large amounts of energy, non-aqueous electrolyte secondary batteries using lithium have been used. In addition, it has been proposed to use non-aqueous electrolyte secondary batteries as power sources for hybrid cars, electric cars, and the like, and the non-aqueous electrolyte secondary batteries have been put into practical use.

Generally, a non-aqueous electrolyte secondary battery has a positive electrode, a negative electrode, and a separator provided therebetween for insulating the positive electrode and the negative electrode. Conventionally, a porous film of a polyolefin-based polymer has been used as a separator used in the non-aqueous electrolyte secondary battery.

In the non-aqueous electrolyte secondary batteries, due to ions (in the case of a lithium-ion secondary battery, lithium ion ($Li^+$)) moving between a positive electrode and a negative electrode through a separator, charging and discharging are possible. Therefore, the separator is required to not inhibit ions from moving freely, and a porous film having a plurality of microscopic holes has been used as the separator.

In addition, the separator is required to have a so-called shutdown function. The shutdown function is a function that improves safety of the non-aqueous electrolyte secondary battery by, for cases where a fine short circuit has occurred in a battery, inhibiting the movement of ions by blocking the holes in the part where the short circuit occurred in order to make the battery lose the function at the part. In the porous film of a polyolefin-based polymer, the shutdown function is achieved by, for cases where a fine short circuit occurred in the battery, melting the part where the short circuit occurred by increasing the temperature and thereby blocking the holes.

However, since the separator formed from polyolefin-based polymer had low affinity toward electrolyte solutions, for cases where an electrolyte solution was retained in the separator, the electrolyte solution merely filled within the holes thereof, and therefore, the separator had a problem that the retention of electrolyte solutions was low. If the retention of electrolyte solutions was low, problems such as reduction in battery capacity, deterioration of cycle characteristics, and limitation on working temperature might arise. Furthermore, the adhesion of the polyolefin-based polymer toward other resins or other materials was poor, a gap was readily formed at an interface between the polyolefin-based polymer and an electrode. As a result, there were cases where reduction in battery capacity and deterioration of charge and discharge characteristics were caused.

Furthermore, a method for producing a lithium-ion secondary battery for the purpose of achieving both electrical connection and adhesion between positive and negative electrodes and a separator has been proposed (e.g. see Patent Document 1). In Patent Document 1, the object described above was achieved by providing an adhesive resin layer between the separator and the electrodes. Furthermore, it was proposed to use polyvinylidene fluoride as the adhesive resin. However, polyvinylidene fluoride was far from being a resin that exhibits excellent adhesion toward polyolefin constituting a separator.

CITATION LIST

Patent Literature

Patent Document 1: Japanese Patent No. 3474853B

SUMMARY OF INVENTION

Technical Problem

An object of the present invention is to provide a method for producing a resin film for a non-aqueous electrolyte secondary battery that is arranged in between a conventional separator and a positive or negative electrode and that does not inhibit movement of ions such as lithium ions, and to provide a resin film for a non-aqueous electrolyte secondary battery obtained by the production method.

Solution to Problem

As a result of diligent research to achieve the above described objects, the present inventors have found that the above described problems can be solved by using a particular vinylidene fluoride polymer, and thus completed the present invention.

That is, the method for producing a resin film for a non-aqueous electrolyte secondary battery of the present invention comprises the steps of: coating a separator with a resin composition containing a solvent and a vinylidene fluoride copolymer obtained by copolymerizing vinylidene fluoride and a compound represented by formula (1) below (coating step); and drying the separator on which the resin composition has been coated (drying step).

[Formula 1]

(1)

In formula (1), $R^1$, $R^2$, and $R^3$ are each independently hydrogen atoms, chlorine atoms, or alkyl groups having from 1 to 5 carbons; and $X'''$ is an atomic group having a molecular weight of 472 or less and having a main chain configured from 1 to 19 atoms. The compound represented by formula (1) above is preferably a compound represented by formula (2) below.

[Formula 2]

(2)

In formula (2), $R^1$, $R^2$, and $R^3$ are each independently hydrogen atoms, chlorine atoms, or alkyl groups having from 1 to 5 carbons; and $X'''$ is an atomic group having a molecular weight of 456 or less and having a main chain configured from 1 to 18 atoms.

In a first aspect of the method for producing a resin film for a non-aqueous electrolyte secondary battery of the present invention, the solvent is a mixed solvent of a good solvent and a poor solvent of the vinylidene fluoride copolymer.

In a second aspect of the method for producing a resin film for a non-aqueous electrolyte secondary battery of the present invention, the method further comprising, in between the coating step and the drying step, a step of immersing, into a poor solvent, the separator on which the resin composition has been coated.

The resin film for a non-aqueous electrolyte secondary battery of the present invention can be obtained by the method for producing a resin film for a non-aqueous electrolyte secondary battery.

Advantageous Effects of Invention

The resin film for a non-aqueous electrolyte secondary battery obtained by the production method of the present invention can be suitably used in a non-aqueous electrolyte secondary battery since the resin film does not inhibit the movement of ions such as lithium ions.

DESCRIPTION OF EMBODIMENTS

Next, the present invention will be described in further detail.

The method for producing a resin film for a non-aqueous electrolyte secondary battery of the present invention comprises the steps of: coating a separator with a resin composition containing a solvent and a vinylidene fluoride copolymer obtained by copolymerizing vinylidene fluoride and a compound represented by formula (1) (coating step); and drying the separator on which the resin composition has been coated (drying step).

Hereinafter, the vinylidene fluoride copolymer, the solvent, the resin composition and the separator used in the present invention will be described and then the production method of the present invention will be described in detail.

(Vinylidene fluoride copolymer)

The vinylidene fluoride copolymer used in the present invention is a copolymer obtained by copolymerizing vinylidene fluoride and a compound represented by formula (1) below.

[Formula 3]

(1)

In formula (1), $R^1$, $R^2$, and $R^3$ are each independently hydrogen atoms, chlorine atoms, or alkyl groups having from 1 to 5 carbons; and $X'$ is an atomic group having a molecular weight of 472 or less and having a main chain configured from 1 to 19 atoms.

The vinylidene fluoride copolymer used in the present invention is a polymer containing a structural unit derived from vinylidene fluoride and a structural unit derived from the compound represented by formula (1) above. In addition, the vinylidene fluoride copolymer may further contain a structural unit derived from another monomer.

Since the vinylidene fluoride copolymer used in the present invention contains a structural unit derived from the compound represented by formula (1) above, the vinylidene fluoride copolymer exhibits excellent adhesion. The compound represented by formula (1) above is preferably a compound represented by formula (2) below. Since, in the vinylidene fluoride copolymer using the compound represented by formula (1) above, a carboxyl group functioning as an adhesive functional group is present via a spacer on a main chain of the vinylidene fluoride polymer, degree of freedom of the arrangement of the carboxyl group is high. Therefore, the functional group can be easily arranged at a position where the functional group can easily exhibit its adhesion imparting properties, and the present inventors conceived that the vinylidene fluoride copolymer used in the present invention exhibits excellent adhesion toward electrodes and separators. Furthermore, the compound represented by formula (1) above contains, in addition to a carboxyl group, a carbonyl group. The present inventors conceived that, since the carbonyl group can be coordinated to a metal atom or can form a hydrogen bond with a carboxyl group or the like, the vinylidene fluoride copolymer obtained by using the compound has excellent adhesion toward electrodes and separators and can exhibit excellent affinity with electrolyte solutions.

[Formula 4]

(2)

In formula (2), $R^1$, $R^2$, and $R^3$ are each independently hydrogen atoms, chlorine atoms, or alkyl groups having from 1 to 5 carbons; and X''' is an atomic group having a molecular weight of 456 or less and having a main chain configured from 1 to 18 atoms.

In formulas (1) and (2) above, although $R^1$, $R^2$, and $R^3$ described above are each independently hydrogen atoms, chlorine atoms, or alkyl groups having from 1 to 5 carbons, from the perspective of polymerization reactivity, in particular, $R^1$ and $R^2$ are preferably substituents with small steric hindrance, and $R^1$ and $R^2$ are preferably hydrogens or alkyl groups having from 1 to 3 carbons, and are more preferably hydrogens or methyl groups.

In formula (1) above, although the molecular weight of the atomic group represented by X' is 472 or less, the molecular weight is preferably 172 or less. Furthermore, the lower limit of the molecular weight of the atomic group represented by X' is not particularly limited; however, X' is typically in a form of —$CH_2$— and, that is, the molecular weight thereof is 14.

Furthermore, in formula (2) above, although the molecular weight of the atomic group represented by X''' is 456 or less, the molecular weight is preferably 156 or less. Furthermore, the lower limit of the molecular weight of the atomic group represented by X''' is not particularly limited; however, X''' is typically in a form of —$CH_2$— and, that is, the molecular weight thereof is 14.

From the perspective of polymerizability, the molecular weight of the atomic group represented by X' or X''' is preferably in the range described above.

In the atomic group represented by X' in formula (1) above, the main chain of the atomic group is configured from 1 to 19 atoms, preferably configured from 1 to 14 atoms, and more preferably configured from 1 to 9 atoms.

Furthermore, in the atomic group represented by X''' in formula (2) above, the main chain of the atomic group is configured from 1 to 18 atoms, preferably configured from 1 to 13 atoms, and more preferably configured from 1 to 8 atoms.

From the perspective of polymerizability, the number of atoms on the main chain is preferably in the range described above.

Note that, in formulas (1) and (2) above, the "number of atoms on the main chain" means the number of atoms on the backbone of the chain that connects a carboxyl group written on the right side of X' or X''' and a group ($R^1R^2C$=$CR^3$—CO— (in formula (1)); or $R^1R^2C$=$CR^3$—COO— (in formula (2))) written on the left side of X' or X''' and that contains a minimum number of atoms.

Note that the number of atoms on the main chain of 2-acryloyloxyethyl succinate (AES) and 2-carboxyethyl acrylate (CEA) used in working examples are as below.

AES corresponds to a compound represented by formula (1) and a compound represented by formula (2). If the compound represented by formula (1) is AES, the atomic group represented by X' is —O$CH_2CH_2$O—(CO)—$CH_2CH_2$—. The number of atoms on the main chain of the atomic group is the number of atoms on a backbone of the straight chain. That is, an oxygen atom that constitutes a carbonyl group or a hydrogen atom that constitutes a methylene group is not included in the number of atoms on the main chain. That is, the backbone of the main chain is —OCCO—C—CC—, and the number of atoms thereof is 7. In the same manner, in the case where the compound represented by formula (2) is AES, the number of atoms on the main chain of the atomic group represented by X''' is 6.

CEA corresponds to a compound represented by formula (1) and a compound represented by formula (2). In the case where the compound represented by formula (1) is CEA, the number of atoms on the main chain of the atomic group represented by X' is 3, and in the case where the compound represented by formula (2) is CEA, the number of atoms on the main chain of the atomic group represented by X''' is 2.

Furthermore, the number of atoms on the main chain of acryloyloxyethyl phthalic acid is as below. Acryloyloxyethyl phthalic acid is a compound represented by formula (B) below, and corresponds to a compound represented by formula (1) and a compound represented by formula (2). In the case where the compound represented by formula (1) is acryloyloxyethyl phthalic acid, the atomic group represented by X' is represented by formula (B') below. The number of atoms on the main chain of the atomic group is the number of atoms on the backbone of the chain that connects, with a minimum number of atoms, a carboxyl group bonded to the atomic group and a group ($CH_2$=CH—CO—) written on the left side. That is, in formula (B') below, the number of atoms on the backbone of the chain connecting the carboxyl group and the group ($CH_2$=CH—CO—) written on the left is considered to be 7 which is the number of atoms shown in formula (B'-1), or 11 which is the number of atoms shown in formula (B'-2); however, in this case, the number of atoms on the main chain is 7, which is the smaller number. In the same manner, in the case where the compound represented by formula (2) is acryloyloxyethyl phthalic acid, the number of atoms on the main chain of the atomic group represented by X''' is 6.

Furthermore, in the case of a compound having a plurality of carboxyl groups, the number of atoms on the main chain is as below. For example, in a compound having a plurality of carboxyl groups, there are chains that respectively connect, with a minimum number of atoms, the carboxyl group and the group written on the left side; however, the number of atoms on the main chain is the smallest value of the numbers of atoms on the backbones of these chains. That is, in a compound having two carboxyl groups, there is a chain for each of the carboxyl groups (hereinafter called "carboxyl group A" and "carboxyl group B" for convenience) that connects, with a minimum number of atoms, the carboxyl group and the group written on the left side; however, for example, in the case where the number of atoms of the backbone of the chain connecting, with a minimum number of atoms, the group written on the left side and carboxyl group A is 3 and the number of atoms of the backbone of the chain connecting, with a minimum number of atoms, the group written on the left side and carboxyl group B is 6, the number of atoms on the main chain in the compound is 3. As a specific example, a compound represented by formula (C) below will be described. The compound represented by formula (C) below corresponds to a compound represented by formula (1) and a compound represented by formula (2). The compound represented by formula (C) has two carboxyl groups. In the case where the compound represented by formula (1) is the compound represented by formula (C), the number of atoms on the backbone of the chain connecting the carboxyl group and the group ($CH_2=CH-CO-$) written on the left side with a minimum number of atoms is considered to be 5 which is the number of atoms shown in formula (C-1), or 7 which is the number of atoms shown in formula (C-2); however, in this case, the number of atoms on the main chain is 5, which is a smaller number of atoms on the backbone. In the same manner, in the case where the compound represented by formula (2) is the compound represented by formula (C), the number of atoms on the main chain of the atomic group represented by X''' is 4.

[Formula 5]

CEA

AES

(B)

(B')

(B'-1)

(B'-2)

(C)

(C-1)

(C-2)

Note that, in the present invention, (meth)acryl and (meth)acrylate mean acryl and/or methacryl and acrylate and/or methacrylate, respectively.

Examples of the compound represented by formula (2) above include 2-carboxyethyl acrylate, 2-carboxyethyl methacrylate, acryloyloxyethyl succinate, methacryloyloxyethyl succinate, acryloyloxyethyl phthalic acid, methacryloyloxyethyl phthalic acid, and the like. Of these, 2-carboxyethyl acrylate, 2-carboxyethyl methacrylate, acryloyloxyethyl succinate, and methacryloyloxyethyl succinate are preferable from the perspective of having excellent copolymerizability with vinylidene fluoride.

The vinylidene fluoride copolymer used in the present invention preferably contains from 0.01 to 10 mol %, more preferably from 0.02 to 7 mol %, and particularly preferably from 0.03 to 4 mol %, of a structural unit derived from the compound represented by formula (1) above (provided that the total of a structural unit derived from vinylidene fluoride and a structural unit derived from the compound represented by formula (1) is 100 mol %). Furthermore, the vinylidene fluoride copolymer preferably contains from 90 to 99.99 mol %, more preferably from 93 to 99.98 mol %, and particularly preferably from 96 to 99.97 mol %, of a structural unit derived from vinylidene fluoride.

Note that, in the vinylidene fluoride copolymer used in the present invention, the content of the structural unit derived from the compound represented by formula (1) and the content of the structural unit derived from vinylidene fluoride can be ordinarily determined by $^1H$ NMR spectrum of the vinylidene fluoride copolymer or by neutralization titration.

Furthermore, examples of the other monomer include fluorine-based monomers or hydrocarbon-based monomers, such as ethylene and propylene, that are copolymerizable with vinylidene fluoride, and monomers that are copolymerizable with the compound represented by formula (1) above.

Examples of the fluorine-based monomer that is copolymerizable with vinylidene fluoride include vinyl fluoride, trifluoroethylene, tetrafluoroethylene, chlorotrifluoroethylene, hexafluoropropylene, perfluoroalkylvinylether exemplified by perfluoromethylvinylether, and the like. The other monomer may be used alone or in a combination of two or more types thereof.

When the vinylidene fluoride copolymer used in the present invention contains a structural unit derived from the other monomer, the vinylidene fluoride copolymer preferably contains from 0.01 to 50 mol % of a structural unit derived from the other monomer relative to 100 mol % of structural units derived from all the monomers constituting the copolymer.

In addition, other than the above-described compounds, examples of the monomer that is copolymerizable with the compound represented by formula (1) above include (meth)acrylic acid, alkyl meth(acrylate) compounds exemplified by methyl (meth)acrylate, and the like. Note that the other monomer may be used alone or in a combination of two or more types thereof.

In the case where the vinylidene fluoride copolymer used in the present invention contains a structural unit derived from the other monomer, the vinylidene fluoride copolymer preferably contains from 0.01 to 10 mol % of a structural unit derived from the other monomer relative to 100 mol % of structural units derived from all the monomers constituting the copolymer.

The vinylidene fluoride copolymer used in the present invention can be obtained by copolymerizing vinylidene fluoride, the compound represented by formula (1) above and, as necessary, the other monomer.

The method of copolymerizing the vinylidene fluoride copolymer used in the present invention is not particularly limited; however, the method such as suspension polymerization, emulsion polymerization, and solution polymerization are generally used. From the perspectives of ease of post treatment and the like, aqueous suspension polymerization and emulsion polymerization are preferable, and aqueous suspension polymerization is particularly preferable.

In suspension polymerization using water as a dispersing medium, a suspending agent, such as methylcellulose, methoxylated methylcellulose, propoxylated methylcellulose, hydroxyethylcellulose, hydroxypropylcellulose, polyvinyl alcohol, polyethylene oxide, and gelatin, may be used by adding in a range of 0.005 to 1.0 parts by mass, and preferably in a range of 0.01 to 0.4 parts by mass, per 100 parts by mass of all the monomers used in the copolymerization (vinylidene fluoride, the compound represented by formula (1), and the other monomer that is copolymerized as necessary).

As a polymerization initiator, diisopropyl peroxydicarbonate, di-n-propyl peroxydicarbonate, di-n-heptafluoropropyl peroxydicarbonate, isobutyryl peroxide, di(chlorofluoroacyl)peroxide, di(perfluoroacyl)peroxide, t-butyl peroxypivalate, and the like can be used. The used amount thereof is from 0.05 to 5 parts by mass, and preferably from 0.15 to 2 parts by mass, per 100 parts by mass of all the monomers used in the copolymerization (vinylidene fluoride, the compound represented by formula (1), and the other monomer that is copolymerized as necessary).

Furthermore, the degree of polymerization of the resulting vinylidene fluoride copolymer can be adjusted by adding a chain transfer agent, such as ethyl acetate, methyl acetate, diethyl carbonate, acetone, ethanol, n-propanol, acetaldehyde, propylaldehyde, ethylpropionate, and carbon tetrachloride. In the case of using a chain transfer agent, the used amount of the chain transfer agent is typically from 0.1 to 5 parts by mass, and preferably from 0.5 to 3 parts by mass, per 100 parts by mass of all the monomers used in the copolymerization (vinylidene fluoride, the compound represented by formula (1), and the other monomer that is copolymerized as necessary).

Furthermore, the charged amount of all the monomer used in the copolymerization (vinylidene fluoride, the compound represented by formula (1), and the other monomer that is copolymerized as necessary) is, in terms of a ratio "total mass of the monomers":"mass of water", typically from 1:1 to 1:10, and preferably from 1:2 to 1:5.

The polymerization temperature T is appropriately selected depending on the 10 hour half-life temperature $T_{10}$ of the polymerization initiator. The polymerization temperature T is typically selected from a range of $T_{10}-25°C. \leq T \leq T_{10}+25°C$. For example, $T_{10}$ of t-butyl peroxypivalate is 54.6° C., and $T_{10}$ of diisopropyl peroxydicarbonate is 40.5° C. (see a product catalog from NOF Corporation). Therefore, in the polymerization using t-butyl peroxypivalate and diisopropyl peroxydicarbonate as polymerization initiators, the polymerization temperatures T are each appropriately selected from a range of $29.6°C. \leq T \leq 79.6°C.$ and a range of $15.5°C. \leq T \leq 65.5°C$. Although the polymerization time is not particularly limited, the polymerization time is preferably 100 hours or less from the perspective of productivity. The polymerization is typically performed under increased pressure, and preferably at 2.0 to 8.0 MPa-G.

By performing aqueous suspension polymerization under the conditions described above, vinylidene fluoride, the compound represented by formula (1), and the other monomer that is copolymerized as necessary can be easily copolymerized to obtain the vinylidene fluoride copolymer of the present invention.

The vinylidene fluoride copolymer used in the present invention preferably has an inherent viscosity (logarithmic viscosity at 30° C. of a solution in which 4 g of a resin is dissolved in 1 L of N,N-dimethylformamide; hereinafter the same) in a range of 0.5 to 5.0 dL/g, and more preferably in a range of 1.0 to 4.0 dL/g. As long as the viscosity is in the range described above, the vinylidene fluoride copolymer can be suitably used in the production of the resin film for a non-aqueous electrolyte secondary battery.

The inherent viscosity $\eta_i$ can be determined by dissolving 80 mg of vinylidene fluoride copolymer in 20 mL of N,N-dimethylformamide, measuring the mixture using a Ubbelohde viscometer in a thermoregulated bath at 30° C., and performing calculation using the following equation.

$$\eta_i = (1/C) \cdot ln(\eta/\eta_0)$$

Here, $\eta$ is the viscosity of the polymer solution, $\eta_0$ is the viscosity of the N,N-dimethylformamide alone of the solvent, and C is 0.4 g/dL.

Furthermore, the vinylidene fluoride copolymer has an absorbance ratio ($A_R$), represented by formula (I) below obtained by infrared absorption spectroscopy, preferably in a range of 0.01 to 5.0, and more preferably in a range of 0.05 to 3.0. If $A_R$ is less than 0.01, the adhesion toward the resin film may be insufficient. On the other hand, if $A_R$ exceeds 5.0, anti-electrolyte property of the vinylidene fluoride copolymer tends to decrease. Note that the infrared absorption spectroscopy of the polymer is performed by obtaining an infrared absorption spectrum of a film that is produced by subjecting the polymer to hot pressing. Specifically, the vinylidene fluoride copolymer is subjected to hot pressing at 200° C. to produce a pressed sheet of 30 mm×30 mm.

Thereafter, the IR spectrum of the pressed sheet in a range of 1500 cm$^{-1}$ to 4000 cm$^{-1}$ is obtained using the infrared spectrophotometer FT-730 (manufactured by HORIBA, Ltd.).

$$A_R = A_{1700-1800}/A_{3023} \quad (I)$$

In the equation (I) above, $A_{1700-1800}$ is the absorbance detected in a range of 1700 to 1800 cm$^{-1}$ assigned to the stretching vibration of a carbonyl group. $A_{3023}$ is the absorbance detected around 3023 cm$^{-1}$ assigned to the stretching vibration of CH. $A_R$ is a measure indicating the content of carbonyl groups that are present in the vinylidene fluoride copolymer.

Note that the content of the structural unit derived from the compound represented by formula (1) can be determined by, for example, $^1$H NMR spectroscopy or by neutralization titration.

For example, for cases where the vinylidene fluoride copolymer used in the present invention is a copolymer of a vinylidene fluoride used in Working Example 1, hexafluoropropylene, and carboxyethyl acrylate, the content of the structural units derived from each monomer in the vinylidene fluoride copolymer can be determined by the method described below. In a $^{19}$F NMR spectrum, a peak of $CF_2$ is observed around −91 to 118 ppm, and a peak of $CF_3$ is observed around −71 ppm. The mole percentage (mol %) of the hexafluoroethylene is determined from an integral ratio of this peak to all the peaks in the spectrum. The content of acryloyloxyethyl succinate can be determined by the mole percentage (mol %) of all the structural units derived from the acryloyloxyethyl succinate in the polymer determined by $^1$H NMR spectroscopy, neutralization titration, or the like.

(Solvent)

The solvent used in the present invention differs depending on whether the method for producing the resin film for a non-aqueous electrolyte secondary battery of the present invention is the first aspect or the second aspect described below.

When the production method is the first aspect described below, a mixed solvent of a good solvent and a poor solvent of the vinylidene fluoride copolymer is typically used as the solvent.

When the production method is the second aspect described below, a good solvent is typically used as the solvent.

Note that, in the present invention, the "good solvent" is a solvent that can dissolve the vinylidene fluoride copolymer, and the "poor solvent" is a solvent that hardly dissolves the vinylidene fluoride copolymer.

Examples of the good solvent include N-methyl-2-pyrrolidone, N,N-dimethylformamide, N,N-dimethylacetamide, dimethylcarbonate, dimethylsulfoxide, hexamethylphosphoramide, dioxane, propylene carbonate, tetrahydrofuran, tetramethylurea, triethyl phosphate, trimethyl phosphate, acetone, methyl ethyl ketone, cyclohexanone, and the like. Furthermore, the good solvent may be used alone or in a combination of two or more types thereof.

Examples of the poor solvent include water, methanol, ethanol, and propanol. Of these, water, methanol, and ethanol are preferable. Furthermore, the poor solvent may be used alone or in a combination of two or more types thereof.

When the production method is the first aspect, acetone, methyl ethyl ketone, dimethyl carbonate, and tetrahydrofuran are preferable as the good solvent from the perspective of volatility. Furthermore, from the perspective of solubility, N-methyl-2-pyrrolidone and N,N-dimethylformamide are preferably added.

When the production method is the second aspect, N-methyl-2-pyrrolidone, N,N-dimethylformamide, N,N-dimethylacetamide and dimethylsulfoxide are preferable as the good solvent.

[Resin Composition]

The resin composition used in the present invention contains the vinylidene fluoride copolymer and the solvent.

Since the vinylidene fluoride copolymer contained in the resin composition used in the present invention contains a structural unit derived from the compound represented by formula (1), the vinylidene fluoride copolymer tends to have excellent adhesion. Furthermore, the resin film for a non-aqueous electrolyte secondary battery produced using the resin composition containing the vinylidene fluoride copolymer does not inhibit movement of ions such as lithium ions.

The resin composition of the present invention typically contains from 0.1 to 50 parts by mass of the vinylidene fluoride copolymer and from 50 to 99.9 parts by mass of the solvent per 100 parts by mass of the resin composition.

Furthermore, when the solvent is a mixed solvent of a good solvent and a poor solvent, the resin composition preferably contains from 0.1 to 50 parts by mass of the vinylidene fluoride copolymer, from 49.99 to 98.89 parts by mass of the good solvent, and from 0.01 to 15 parts by mass of the poor solvent, and more preferably contains from 0.5 to 25 parts by mass of the vinylidene fluoride copolymer, from 74.99 to 98.49 parts by mass of the good solvent, and from 0.01 to 10 parts by mass of the poor solvent per 100 parts by mass of the resin composition.

Furthermore, when the solvent is a good solvent, the resin composition preferably contains from 0.1 to 50 parts by mass of the vinylidene fluoride copolymer and from 99.9 to 50 parts by mass of the good solvent, and more preferably contains from 0.5 to 25 parts by mass of the vinylidene fluoride copolymer and from 75 to 99.5 parts by mass of the good solvent per 100 parts by mass of the resin composition.

The method of preparing the resin composition used in the present invention is not particularly limited, and, for example, the resin composition can be obtained by adding a vinylidene fluoride copolymer in a solvent and stirring.

When the solvent is the mixed solvent, the method of preparing the resin composition is not particularly limited. Typically, examples of the method include a method of obtaining the resin composition by mixing a good solvent and a poor solvent to obtain a mixed solvent, adding a vinylidene fluoride copolymer in the mixed solvent, and then stirring in order to dissolve the vinylidene fluoride copolymer; a method of obtaining the resin composition by simultaneously stirring a vinylidene fluoride copolymer, a good solvent, and a poor solvent in order to dissolve the vinylidene fluoride copolymer; and a method of obtaining the resin composition by adding a vinylidene fluoride copolymer in a good solvent, stirring the mixture in order to dissolve the vinylidene fluoride copolymer, and mixing a poor solvent with the good solvent in which the vinylidene fluoride copolymer has been dissolved.

Furthermore, when the solvent is a good solvent, the resin composition can be obtained by adding the vinylidene fluoride copolymer in the good solvent and stirring.

In order to adjust the viscosity of the resin composition used in the present invention, in addition to the vinylidene fluoride copolymer described above, other vinylidene fluoride copolymers may be compounded.

The resin composition used in the present invention may contain, as necessary, various additives such as inorganic fillers, organic fillers, plasticizer, dispersing agent, and the like.

[Separator]

The separator on which the resin composition is coated is not particularly limited.

The separator used in the present invention is a separator that constitutes a non-aqueous electrolyte secondary battery and that serves a function of electrically insulating a positive electrode and a negative electrode and holding the electrolyte solution. The separator used in the present invention is not particularly limited, and examples of the separator include polyolefin-based polymers such as polyethylene and polypropylene, polyester-based polymers such as polyethylene terephthalate, aromatic polyamide-based polymers, polyimide-based polymer such as polyether imide, polyether sulfone, polysulfone, polyether ketone, polystyrene, polyethylene oxide, polycarbonate, polyvinyl chloride, polyacrylonitrile, polymethyl methacrylate, ceramics, and the like, and a monolayer and multilayer porous film, nonwoven fabric, or the like that is formed from the mixture thereof, and the like. In particular, a porous film of polyolefin-based polymer (polyethylene, polypropylene) can be used. Examples of the polyolefin-based polymer porous film include monolayer polypropylene separators, monolayer polyethylene separators, and trilayer polypropylene/polyethylene/polypropylene separators that are commercially available as Celgard (registered trademark) from Polypore International, Inc., and the like. Note that, on these separator, a layer containing at least one of organic particles or inorganic particles can be coated.

Note that, in order to secure the insulation between the positive electrode structure and the negative electrode structure, the separator is preferably larger than the positive electrode structure and the negative electrode structure.

[Method for producing resin film for a non-aqueous electrolyte secondary battery]

The method for producing a resin film for a non-aqueous electrolyte secondary battery of the present invention comprises the steps of: coating a separator with a resin composition containing a solvent and a vinylidene fluoride copolymer obtained by copolymerizing vinylidene fluoride and a compound represented by formula (1) (coating step); and drying the separator on which the resin composition has been coated (drying step).

There are mainly two aspects of the method for producing the resin film for a non-aqueous electrolyte secondary battery of the present invention described below.

In the first aspect of the method for producing a resin film for a non-aqueous electrolyte secondary battery of the present invention, a mixed solvent of a good solvent and a poor solvent of the vinylidene fluoride copolymer is used as the solvent.

That is, the method for producing a resin film for a non-aqueous electrolyte secondary battery (first aspect) comprises the steps of: coating a separator with the resin composition containing the vinylidene fluoride copolymer and the mixed solvent containing the good solvent and the poor solvent (coating step); and drying the separator on which the resin composition has been coated (drying step).

In a second aspect of the method for producing a resin film for a non-aqueous electrolyte secondary battery of the present invention, the method further comprising, in between the coating step and the drying step, a step of immersing, into a poor solvent, the separator on which the resin composition has been coated.

That is, the method for producing a resin film for a non-aqueous electrolyte secondary battery (second aspect) comprises the steps of: coating a separator with the resin composition containing the vinylidene fluoride copolymer and the solvent (coating step); then immersing, into a poor solvent, the separator on which the resin composition has been coated (immersing step); and subsequently drying the separator on which the resin composition has been coated (drying step). For cases where this method for producing the resin film for a non-aqueous electrolyte secondary battery (second aspect) is performed, the good solvent is preferable as the solvent that is contained in the resin composition.

The coating step is a step of coating the resin composition onto a separator. The method of coating is not particularly limited, and examples thereof include a method of coating the resin composition on the substrate using a bar coater, die coater, comma coater, gravure coater such as a direct gravure, reverse gravure, reverse kiss gravure, off set gravure, or similar gravure coater, reverse roll coater, micro gravure coater, air knife coater, dip coater, and the like. Note that the amount of coating is adjusted so that the thickness of the obtained resin film for a non-aqueous electrolyte secondary battery is in a range described below.

The drying step is a step of drying the separator on which the resin composition has been coated. The drying step is typically performed after the coating step in the first aspect, and is typically performed after the immersing step described below in the second aspect.

The drying is performed in order to remove the solvent in the resin composition coated on the separator, and is typically performed at a temperature of 0 to 200° C. for 2 seconds to 10 minutes. Furthermore, the pressure at the drying is not particularly limited; however, generally, the drying is performed under atmospheric pressure or reduced pressure.

The immersing step performed in the method for producing the resin film for a non-aqueous electrolyte secondary battery (second aspect), is a step performed after the coating step and before the drying step, and is a step in which the separator on which the resin composition has been coated is immersed in a poor solvent. The poor solvent described in the above "Solvent" section can be used as the poor solvent used in the immersing step.

Furthermore, immersing is performed typically at a temperature of 0 to 100° C. for 2 seconds to 10 minutes.

It is possible to form a resin film for a non-aqueous electrolyte secondary battery on a separator by performing the steps described above.

Furthermore, in the method for producing a resin film for a non-aqueous electrolyte secondary battery (first aspect), a mixed solvent of the good solvent and the poor solvent is used as the solvent. Since the vinylidene fluoride copolymer in the resin composition does not dissolve in the poor solvent but dissolves in the good solvent, the vinylidene fluoride copolymer is conceived to be dispersed in the resin composition. Therefore, the resin film obtained by coating and drying the resin composition is conceived to have a porous structure.

Furthermore, in the method for producing a resin film for a non-aqueous electrolyte secondary battery (second aspect), since the good solvent is used as the solvent, the vinylidene fluoride copolymer is conceived to be uniformly dispersed in the resin composition. Therefore, it is conceived that, at the time when a coated film is formed on the separator by the coating step, a uniform film can be obtained; however, by the following immersing step, the obtained resin film forms a porous structure when the resin film comes into contact with the poor solvent.

[Resin film for a non-aqueous electrolyte secondary battery]

The resin film for a non-aqueous electrolyte secondary battery of the present invention can be obtained by the method for producing a resin film for a non-aqueous electrolyte secondary battery.

The resin film for a non-aqueous electrolyte secondary battery of the present invention can be used as a separator auxiliary layer that is provided, typically, in between a separator and a positive or negative electrode constituting the non-aqueous electrolyte secondary battery.

Since the vinylidene fluoride copolymer used in the present invention has superior electrolyte solution retention and superior adhesion between a separator and an electrode compared to polyolefin which constitutes conventional separators, the safety of a non-aqueous electrolyte secondary battery containing the resin film of the present invention is enhanced.

The resin film for a non-aqueous electrolyte secondary battery of the present invention may be formed only of the vinylidene fluoride copolymer. For cases where a component other than the vinylidene fluoride copolymer and the solvent (other component) is used in the resin composition, the resin film for a non-aqueous electrolyte secondary battery of the present invention may contain the other component.

The thickness of the resin film for a non-aqueous electrolyte secondary battery of the present invention is typically from 0.01 to 50 µm, and preferably from 0.1 to 20 µm, from the perspectives of coatability and ionic conductivity.

Furthermore, as described below, the resin film for a non-aqueous electrolyte secondary battery of the present invention is generally formed on an electrode or a separator. In the case where the resin film is formed on a separator, the Gurley air permeability of a separator on which the resin film for a non-aqueous electrolyte secondary battery of the present invention is provided is typically from 50 to 2000 s/100 mL, and preferably from 100 to 1500 s/100 mL. The range described above is preferable from the perspectives of ionic conductivity and ease of impregnating with an electrolyte solution. When the Gurley air permeability is in the range described above, it is assumed that the resin film for a non-aqueous electrolyte secondary battery has a porous structure.

[Non-aqueous electrolyte secondary battery]

Hereinafter, the non-aqueous electrolyte secondary battery having the resin film for a non-aqueous electrolyte secondary battery of the present invention will be described in detail.

The resin film for a non-aqueous electrolyte secondary battery of the present invention is positioned in between an electrode and a separator.

Figure 1:
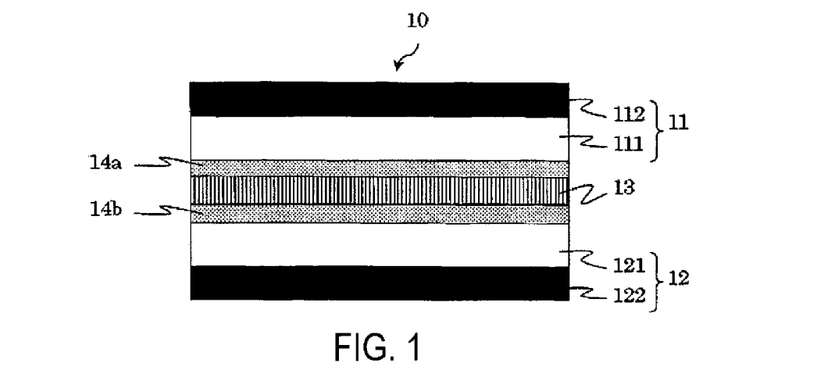
FIG. 1 is a cross sectional schematic diagram illustrating a structure of a non-aqueous electrolyte secondary battery containing a resin film of the present invention.

A cross sectional schematic diagram of a non-aqueous electrolyte secondary battery having a resin film for a non-aqueous electrolyte secondary battery (hereinafter, also referred to as "separator auxiliary layer") of the present invention is illustrated in FIG. 1.

In the non-aqueous electrolyte secondary battery containing the separator auxiliary layer, the separator auxiliary layer is arranged in between the positive electrode 11 and the separator 13, in between the negative electrode 12 and the separator 13, or both in between the positive electrode 11 and the separator 13 and in between the negative electrode 12 and the separator 13. Note that, in FIG. 1, the separator auxiliary layer arranged in between the positive electrode 11 and the separator 13 is indicated as "14a", and the separator auxiliary layer arranged in between the negative electrode 12 and the separator 13 is indicated as "14b". Note that, in FIG. 1, the separator auxiliary layers are arranged in between the positive electrode 11 and the separator 13 as well as in between the negative electrode 12 and the separator 13; however, the separator auxiliary layer is preferably provided both in between the positive electrode 11 and the separator 13 and in between the negative electrode 12 and the separator 13 from the perspectives of adhesion toward an electrode and oxidation-reduction resistance. Note that, when the separator in which a layer containing at least one of organic particles or inorganic particles is coated in advance is used, the layer containing at least one of organic particles or inorganic particles may be arranged at at least one of the sides in between the separator 13 and the separator auxiliary layer.

Note that the non-aqueous electrolyte secondary battery having a separator auxiliary layer 14a arranged in between the positive electrode 11 and the separator 13 is preferable from the perspective of enhancing the oxidation resistance.

Note that the method for producing the non-aqueous electrolyte secondary battery can be a method that is the same as conventional methods except for using the separator provided with the separator auxiliary layer.

Furthermore, the non-aqueous electrolyte secondary battery can have a publicly known battery structure such as a coin-type battery, button-type battery, cylinder-type battery, or square-type battery structure.

Note that, in FIG. 1, the positive electrode mixture layer constituting the positive electrode 11 is indicated as "111", the positive electrode current collector is indicated as "112", the negative electrode mixture layer constituting the negative electrode 12 is indicated as "121", and the negative electrode current collector is indicated as "122".

Furthermore, examples of the members that constitute the non-aqueous electrolyte secondary battery other than the positive electrode, the negative electrode, the separator, and the separator auxiliary layer include a non-aqueous electrolyte solution, a cylindrical case, a laminated pouch, and the like.

The positive electrode is not particularly limited as long as the positive electrode contains a positive electrode active material that involves in a positive electrode reaction and has a current collecting function; however, in many cases, the positive electrode is composed of a positive electrode mixture layer containing a positive electrode active material and a positive electrode current collector that, as well as functioning as a current collector, serves to hold the positive electrode mixture layer.

Furthermore, the negative electrode is not particularly limited as long as the negative electrode contains a negative electrode active material that involves in a negative electrode reaction and has a current collecting function; however, in many cases, the negative electrode is composed of a negative electrode mixture layer containing a negative electrode active material and a negative electrode current collector that, as well as functioning as a current collector, serves to hold the negative electrode mixture layer.

Note that, in the present specification, a positive electrode and negative electrode may be comprehensively described as "electrodes", a positive electrode mixture layer and negative electrode mixture layer may be comprehensively described as "electrode mixture layers", and a positive electrode current collector and negative electrode current collector may be comprehensively described as "current collectors".

In the present invention, the electrode mixture layer contains an electrode active material and a binding agent, and as necessary, the electrode mixture layer can further contain a conductivity promoter.

Here, the compounding ratio of the electrode active material, the binding agent, and the conductivity promoter in the electrode mixture layer can be a generally used compounding ratio used in conventionally known non-aqueous electrolyte secondary batteries such as lithium-ion secondary batteries; however, the compounding ratio can be appropriately adjusted depending on the type of the electrolyte secondary battery.

The thickness of the electrode mixture layer is typically from 20 to 250 µm.

The electrode active material used in the non-aqueous electrolyte secondary battery of the present invention is not particularly limited, and a conventionally known electrode active material for negative electrodes and a conventionally known electrode active material for positive electrodes can be used.

Here, in the case where the non-aqueous electrolyte secondary battery is a lithium-ion secondary battery, the positive electrode active material constituting the positive electrode mixture layer is preferably a lithium-based positive electrode active material containing at least lithium.

Examples of the lithium-based positive electrode active material include composite metal chalcogen compounds represented by general formula: $LiMY_2$ (M represents at least one type of transition metals such as Co, Ni, Fe, Mn, Cr, and V; Y represents a chalcogen element such as O and S) such as $LiCoO_2$, $LiNi_xCo_{1-x}O_2$ ($0 \leq x \leq 1$), composite metal oxides having a spinel structure such as $LiMn_2O_4$; olivin-type lithium compounds such as $LiFePO_4$; and the like. Note that a commercially available product may be used as the positive electrode active material.

The specific surface area of the positive electrode active material is preferably from 0.05 to 50 $m^2/g$.

On the other hand, examples of the negative electrode active material constituting the negative electrode mixture layer include carbon materials, metal/alloy materials, metal oxides, and the like. Of these, carbon materials are preferable.

As the carbon material, artificial graphite, natural graphite, non-graphitizable carbon, easily graphitizable carbon, or the like is used. Furthermore, the carbon material may be used alone or in a combination of two or more types thereof.

When such a carbon material is used, the energy density of the battery can be increased.

The artificial graphite can be obtained by, for example, carbonizing an organic material, heat treating the material at higher temperature, and crushing and sieving the material. The non-graphitizable carbon can be obtained by, for example, calcining a material derived from petroleum pitch at 1000 to 1500° C.

Note that a commercially available product may be used as these negative electrode active materials.

The specific surface area of the negative electrode active material is preferably from 0.3 to 10 $m^2/g$. If the specific surface area exceeds 10 $m^2/g$, decomposed amount of the electrolyte solution may increase thereby increasing the initial irreversible capacity.

Note that the specific surface area of the electrode active material can be determined by nitrogen adsorption method.

However, the positive electrode active material and the negative electrode active material constituting the non-aqueous electrolyte secondary battery of the present invention are not particularly limited to these, and can be appropriately selected depending on the type of the secondary battery.

In the present invention, the electrode mixture layer may further contain a conductivity promoter as necessary. This conductivity promoter is added for the purpose of enhancing the conductivity of the electrode mixture layer in the case where an active material having small electrical conductivity such as $LiCoO_2$ is used. As the conductivity promoter, carbonaceous materials such as carbon black and graphite fine powders or fibers, and metal fine powders or fibers such as nickel and aluminum are used.

The binding agent used in the non-aqueous electrolyte secondary battery of the present invention serves a function of binding the electrode active material and the conductivity promoter described above.

Here, although the binding agent is not particularly limited, binding agents used widely in conventionally known lithium-ion secondary battery can be suitably used. As the binding agent, fluorine-containing resins such as polytetrafluoroethylene, polyvinylidene fluoride, and fluororubber, mixtures of styrene-butadiene rubber and carboxymethyl cellulose, thermoplastic resins such as polypropylene and polyethylene, and the like can be used. Furthermore, a vinylidene fluoride copolymer can be used as the fluorine-containing resin. As the vinylidene fluoride copolymer, vinylidene fluoride-monomethylester maleate copolymer, or a vinylidene fluoride copolymer obtained by copolymerizing the vinylidene fluoride and a compound represented by formula (1), and the like can be used.

The positive electrode current collector and the negative electrode current collector are not particularly limited as long as the positive electrode current collector and the negative electrode current collector have suitable electrical conductivity so that the electricity can be supplied to the outside of the secondary battery, and do not inhibit the electrode reaction of the secondary battery.

Examples of these current collectors used in the present invention include current collectors that are generally used as current collectors for non-aqueous electrolyte secondary batteries such as lithium-ion secondary batteries. Examples of the material for such current collectors include iron, stainless steel, steel, copper, aluminum, nickel, titanium, and the like. Current collectors in which these metals are made into foil, a net, or the like form are suitably used.

In the case where the lithium-ion secondary battery is a non-aqueous electrolyte secondary battery, the positive electrode current collector is preferably a positive electrode current collector formed from aluminum or alloys of aluminum, and of these, a positive electrode current collector formed from aluminum foil is preferable. On the other hand, the negative electrode current collector is preferably a negative electrode current collector formed from copper, and of these, a negative electrode current collector formed from copper foil is preferable. The current collectors constituting the electrodes are not limited to these, and can be appropriately selected depending on the types of the secondary battery. The thickness of the current collector is typically from 5 to 100 µm.

Although the method of producing an electrode formed from a current collector and an electrode mixture layer that can be used in the present invention is not particularly limited, the electrode can be obtained by coating the electrode mixture containing each component constituting the electrode mixture layer onto the current collector and drying.

When preparing the electrode mixture, the order of compounding is not particularly limited as long as the electrode active material, the binding agent, and the conductivity promoter which is added as necessary, and the non-aqueous solvent are mixed into a uniform slurry.

As the non-aqueous solvent that is used to disperse these electrode active material, conductivity promoter, and binding agent, for example, N-methyl-2-pyrrolidone and the like can be used.

Although the electrode used in the present invention is produced by coating the electrode mixture onto the current collector and drying, the coating of the electrode mixture is performed on at least one side of the current collector, and preferably performed on both sides. The method of coating the electrode mixture is not particularly limited, and examples of the method include methods of coating the electrode mixture using a bar coater, die coater, or comma coater, and the like.

Furthermore, the drying that is performed after coating is typically performed at a temperature of 50 to 150° C. for 1 to 300 minutes. Furthermore, the pressure at the drying is not particularly limited; however, generally, the drying is performed under atmospheric pressure or reduced pressure. Note that heat treatment can be further performed after the drying. Furthermore, instead of the heat treatment or after the heat treatment, pressing treatment can be further performed. In the case where pressing treatment is performed, the pressing treatment is typically performed from 1 to 200 MPa-G. Performing the pressing treatment is preferable since the electrode density can be improved.

The non-aqueous electrolyte solution is a solution formed by dissolving an electrolyte in a non-aqueous solvent.

Examples of the non-aqueous solvent include aprotic organic solvents that can transport cations and anions constituting the electrolyte, and that does not substantially impair the function of the secondary battery. Examples of such a non-aqueous solvent include organic solvents that are generally used in a non-aqueous electrolyte solution for lithium-ion secondary batteries, and for example, carbonates, halogenated hydrocarbons, ethers, ketones, nitriles, lactones, esters, oxolane compounds, and the like can be used. Of these, propylene carbonate, ethylene carbonate, dimethyl carbonate, diethyl carbonate, ethylmethyl carbonate, 1,2-dimethoxyethane, 1,2-diethoxyethane, tetrahydrofuran, γ-butyrolactone, methyl propionate, ethyl propionate, and the like are preferable. These non-aqueous solvent may be used alone or in a combination of two or more types thereof.

Furthermore, the types of the electrolyte is not particularly limited as long as the electrolyte is an electrolyte in which the constituent cations and anions can be transported by the non-aqueous solvent, and that does not substantially impair the function of the secondary battery. Here, examples of the electrolyte that can be used in the case where the non-aqueous electrolyte secondary battery is a lithium-ion secondary battery include lithium salts of a fluoro complex anion such as $LiPF_6$, $LiAsF_6$, and $LiBF_4$; inorganic lithium salts such as $LiClO_4$, $LiCl$, and $LiBr$; and lithium salts of sulfonic acid such as $LiCH_3SO_3$ and $LiCF_3SO_3$; and organic lithium salts such as $Li(CF_3OSO_2)_2N$, $Li(CF_3OSO_2)_3C$, $Li(CF_3SO_2)_2N$, and $Li(CF_3SO_2)_3C$. These electrolytes may be used alone or in a combination of two or more types thereof.

EXAMPLES

Next, the present invention will be further described in detail using examples; however, the present invention is not limited by these examples.

Working Example 1

(Production of vinylidene fluoride-hexafluoropropylene-acryloyloxyethyl succinate copolymer)

In an autoclave with a capacity of 2 L, 1040 g of ion exchanged water, 0.6 g of Metolose SM-100 (manufactured by Shin-Etsu Chemical Co., Ltd.) as a cellulose-based suspending agent, 0.4 g of acryloyloxyethyl succinate, 3.6 g of 50 wt. % diisopropyl peroxydicarbonate-CFC 225cb solution, 0.4 g of ethyl acetate, 360 g of vinylidene fluoride, and 40 g of hexafluoropropylene were charged and the temperature was raised to 29° C. in 1 hour.

Thereafter, the temperature was kept at 29° C., and 482 g/L of a methanol solution of acryloyloxyethyl succinate was gradually added at such a rate that the polymerization pressure became constant. The addition of the methanol solution of acryloyloxyethyl succinate was performed for total of 10.5 hours from the start of the temperature increase. Total of 4.0 g of acryloyloxyethyl succinate was added including the initially added amount. The polymerization was performed for total of 23.3 hours from the start of the temperature increase. Note that the pressure at the initial stage of the polymerization was 4.12 MPa-G, and the pressure at the time of stopping the polymerization was 1.9 MPa-G. Furthermore, the polymerization was performed while stirring at a rotational speed of 600 rpm.

After stopping the polymerization, the polymer slurry was heat treated at 95° C. for 60 minutes. Thereafter, the polymer slurry was dewatered, washed with water, and further dried at 80° C. for 20 hours to obtain polymer powder of vinylidene fluoride-hexafluoropropylene-acryloyloxyethyl succinate copolymer. The yield of the polymer was 84%, the inherent viscosity of the obtained polymer was 2.10 dL/g, and the absorbance ratio ($A_R$) was 0.9.

A $^1H$ NMR spectrum of the polymer powder was recorded under the following conditions.

Device: AVANCE AC 400FT NMR SPECTROMETER, manufactured by Bruker
Measurement Conditions
Frequency: 400 MHz
Measurement solvent: $DMSO-d_6$
Measurement temperature: 25° C.

The $^1H$ NMR spectrum was analyzed to determine the ratio of the content of structural units derived from vinylidene fluoride to the content of structural units derived from acryloyloxyethyl succinate in the polymer based on the integral intensities of the signal at 4.18 ppm mainly assigned to acryloyloxyethyl succinate and of the signals at 2.23 ppm and 2.87 ppm mainly assigned to vinylidene fluoride.

A $^{19}F$ NMR spectrum of the polymer powder was recorded under the following conditions.

Device: AVANCE AC 400FT NMR SPECTROMETER, manufactured by Bruker
Measurement Conditions
Frequency: 376 MHz
Measurement solvent: $DMSO-d_6$
Measurement temperature: 25° C.

The ratio of the content of vinylidene fluoride to the content of hexafluoropropylene in the polymer was calculated from the ratio of the intensity of peaks (integral values) at −91 to 118 ppm assigned to the fluorine atoms in the $CF_2$ structure and at around −71 ppm assigned to the fluorine atoms in the $CF_3$ structure in the $^{19}F$ NMR spectrum.

In the obtained vinylidene fluoride copolymer, the content of the structural units derived from vinylidene fluoride (VDF content: mol %) was 94.97 mol %, the hexafluoropropylene content was 4.54 mol %, and the AES content was 0.49 mol %.

(Production of resin film)

In 75 parts by weight of methyl ethyl ketone, 10 parts by weight of water, and 15 parts by weight of N-methyl-2-pyrrolidone, 4.0 parts by weight of the vinylidene fluoride-hexafluoropropylene-acryloyloxyethyl succinate copolymer was dissolved at 40° C. to obtain a coating liquid for a separator.

The coating liquid was coated onto a separator (Celgard 2500, manufactured by Polypore International, Inc.; monolayer polypropylene porous film; film thickness: 25 μm; Gurley air permeability: 200 [s/100 mL]) using a Meyer bar (wet 100 [g/m$^2$]), dried at 70° C. for 10 minutes, and then vacuum dried at 80° C. for 1 hour to obtain a separator on which a resin film was formed. The thickness of the obtained resin film part was 3 μm.

The Gurley air permeability of the separator on which the resin film was formed was measured using a Gurley type densometer (manufactured by Toyo Seiki Seisaku-sho, Ltd.) in accordance with JIS P 8117 and ISO 5636. The Gurley air permeability of the separator was 1150 s/100 mL.

Figure 2:
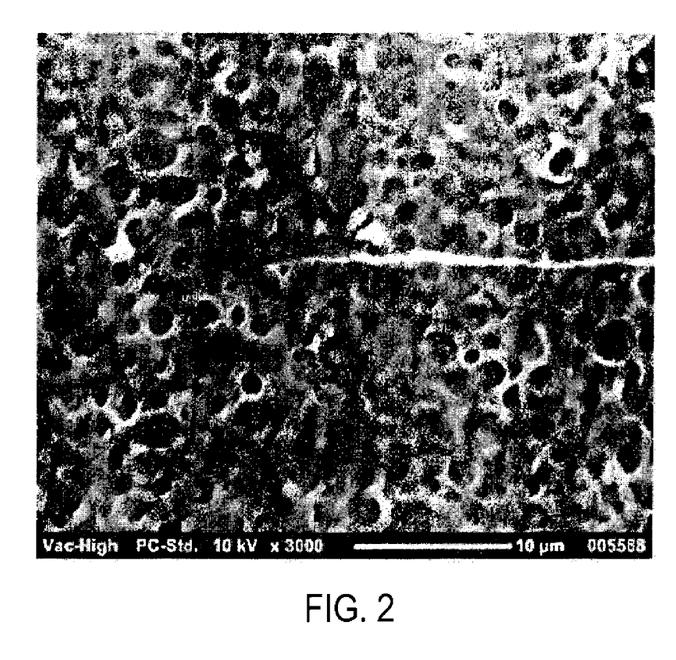
FIG. 2 is an SEM photograph of a resin film surface of a separator on which the resin film has been formed obtained in Working Example 1 of the present invention.

Furthermore, the surface of the obtained resin film was gold deposited and observed by an SEM, NeoScope JCM-5000 (manufactured by JEOL Ltd.), at an acceleration voltage of 10 kV. The obtained SEM photograph is in FIG. 2.

Working Example 2

(Production of vinylidene fluoride-carboxyethyl acrylate copolymer)

In an autoclave with a capacity of 2 L, 900 g of ion exchanged water, 0.4 g of Metolose 90SH-100 (manufactured by Shin-Etsu Chemical Co., Ltd.) as a cellulose-based suspending agent, 0.2 g of carboxyethyl acrylate, 2.0 g of 50 wt. % t-butyl peroxypivalate-CFC 225cb solution, and 396 g of vinylidene fluoride were charged, and the temperature was raised to 50° C. in 2 hours.

Thereafter, the temperature was kept at 50° C., and 15 g/L of carboxyethyl acrylate aqueous solution was gradually added at such a rate that the polymerization pressure became constant. Total of 4.0 g of carboxyethyl acrylate was added including the initially added amount.

Polymerization was stopped at the time when the addition of carboxyethyl acrylate aqueous solution was completed, and the polymerization was performed for total of 8.6 hours from the start of the temperature increase. Note that the pressure at the initial stage of the polymerization was 6.23 MPa-G, and the pressure at the time of stopping the polymerization was 6.03 MPa-G. Furthermore, the polymerization was performed while stirring at a rotational speed of 600 rpm.

After stopping the polymerization, the polymer slurry was heat treated at 95° C. for 60 minutes. Thereafter, the polymer slurry was dewatered, washed with water, and further dried at 80° C. for 20 hours to obtain polymer powder of vinylidene fluoride-carboxyethyl acrylate copolymer.

A $^1$H NMR spectrum of the polymer powder was recorded under the same conditions as described above.

The $^1$H NMR spectrum was analyzed to determine the ratio of the content of structural units derived from vinylidene fluoride to the content of structural units derived from carboxymethyl acrylate in the polymer based on the integral intensities of the signal at 4.18 ppm mainly assigned to carboxymethyl acrylate and of the signals at 2.23 ppm and 2.87 ppm mainly assigned to vinylidene fluoride.

In the obtained vinylidene fluoride copolymer, the content of the structural units derived from vinylidene fluoride (VDF content: mol %) was 98.95 mol %, and the CEA content was 1.05 mol %.

The yield of the polymer was 39%, the inherent viscosity of the obtained polymer was 3.12 dL/g, and the absorbance ratio ($A_R$) was 1.10.

(Production of resin film)

In 100 parts by weight of N-methyl-2-pyrrolidone, 4 parts by weight of the vinylidene fluoride-carboxyethyl acrylate copolymer was dissolved to obtain a coating liquid for a separator.

The coating liquid was coated onto a separator (Celgard 2500, manufactured by Polypore International, Inc.) using a Meyer bar (wet 60 [g/m$^2$]), immediately immersed in a methanol solution for 10 minutes, dried at 80° C. for 10 minutes, and then vacuum dried at 80° C. for 1 hour to obtain a separator on which a resin film was formed. The thickness of the obtained resin film part was 3 μm.

The Gurley air permeability of the separator on which the resin film was formed was measured using a Gurley type densometer (manufactured by Toyo Seiki Seisaku-sho, Ltd.) in accordance with JIS P 8117 and ISO 5636. The Gurley air permeability of the separator was 680 s/100 mL.

Figure 3:
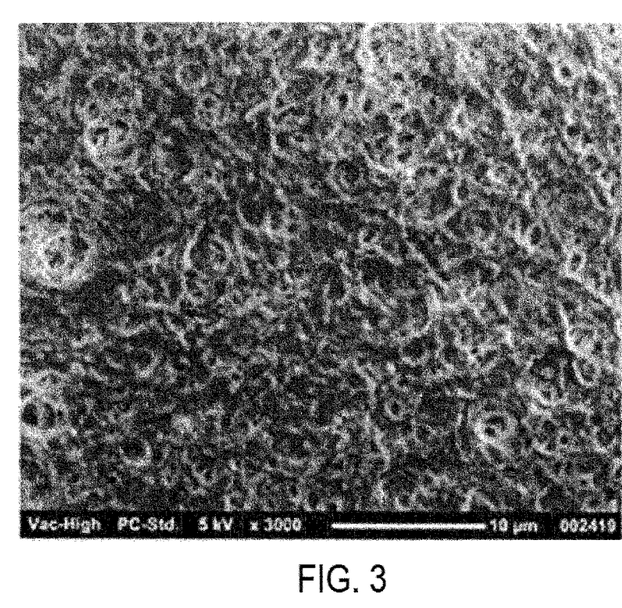
FIG. 3 is an SEM photograph of a resin film surface of a separator on which the resin film has been formed obtained in Working Example 2 of the present invention.

Furthermore, the surface of the obtained resin film was gold deposited and observed by an SEM, NeoScope JCM-5000 (manufactured by JEOL Ltd.), at an acceleration voltage of 5 kV. The obtained SEM photograph is in FIG. 3.

As a result of the working examples, all of the separators exhibited sufficient Gurley air permeability. Therefore, the separator on which the resin film has been formed does not inhibit the movement of ions.

Working Example 3

(Production of resin film)

In 96 parts by weight of N-methyl-2-pyrrolidone, 4 parts by weight of the vinylidene fluoride-hexafluoropropylene-acryloyloxyethyl succinate copolymer obtained by Working Example 1 was dissolved to obtain a coating liquid for a separator.

The separator (Hipore ND420, manufactured by Asahi Kasei Corporation; film thickness: 20 μm; Gurley air permeability: 320 [s/100 mL]) immersed in the coating liquid was pulled up between two Meyer bars (wet 36 [g/m$^2$]) to coat the both side of the separator. Thereafter, the separator was immediately immersed in water at room temperature, dried at 80° C. for 10 minutes, and then vacuum dried at 80° C. for 30 minutes to obtain a separator on which resin films have been formed. The thickness of the obtained resin film part was approximately 3 μm per side.

The Gurley air permeability of the separator on which the resin film was formed was measured using a Gurley type densometer (manufactured by Toyo Seiki Seisaku-sho, Ltd.) in accordance with JIS P 8117 and ISO 5636. The Gurley air permeability of the separator was 409 s/100 mL.

Figure 4:
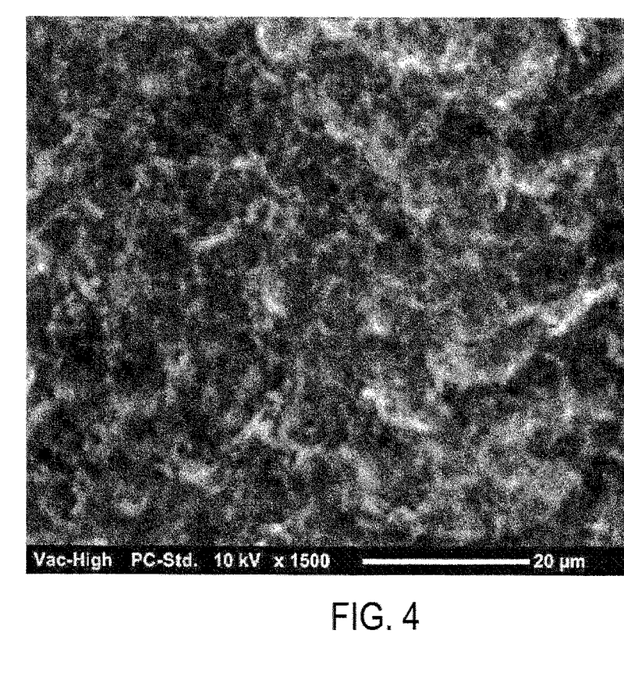
FIG. 4 is an SEM photograph of a resin film surface of a separator on which the resin film has been formed obtained in Working Example 3 of the present invention.

The surface of the obtained resin film was gold deposited and observed by an SEM, NeoScope JCM-5000 (manufactured by JEOL Ltd.), at an acceleration voltage of 10 kV. The obtained SEM photograph is in FIG. 4.

(Production of positive electrode for peel strength measurement)

An N-methyl-2-pyrrolidone solvent slurry (solid concentration: 69 wt. %) was produced in the manner such that the weight ratio of lithium cobaltate (Cellseed C5, manufactured by Nippon Chemical Industrial Co., Ltd.) to a conductivity promoter (Super P, manufactured by TIMCAL) to PVDF (polyvinylidene fluoride; KF#1100, manufactured by Kureha Corporation) was 93:3:4. The slurry was coated on Al foil (thickness: 15 μm) using a 115 μm spacer. Thereafter, the coated foil was dried at 120° C. for 3 hours, and pressed to obtain a positive electrode in which the bulk density of the layer obtained by coating and drying the slurry was 3.6 g/cm$^3$, and the basis weight was 150 g/m$^2$.

(Production of negative electrode for peel strength measurement)

An aqueous solvent slurry (solid concentration: 53 wt. %) was produced in the manner such that the weight ratio of BTR918 (modified natural graphite, manufactured by BTR) to a conductivity promoter (Super P, manufactured by TIMCAL) to SBR (styrene-butadiene rubber latex; BM-400, manufactured by Zeon Corporation) to CMC (carboxymethyl cellulose; Cellogen 4H, manufactured by Dai-ichi Kogyo Seiyaku Co., Ltd.) was 90:2:3:1. The slurry was coated on Cu foil (thickness: 10 μm) using a 90 μm spacer. Thereafter, the coated foil was dried at 120° C. for 3 hours, and pressed to obtain a negative electrode in which the bulk density of the layer obtained by coating and drying the slurry was 1.5 g/cm$^3$, and the basis weight was 56 g/m$^2$.

(Production of sample for peel strength measurement and measurement of peel strength)

The obtained positive electrode and negative electrode were cut to 2.5×5.0 cm and the separator on which the resin film was formed was cut to 3.0×6.0 cm, and each of the positive electrode, negative electrode, and separator were connected. The assembly was impregnated with an electrolyte solution (ethylene carbonate (EC)/ethyl methyl carbonate (EMC)=3/7, LiPF$_6$ 1.2 M), and sealed in an Al laminated cell by vacuum degassing.

The obtained Al laminated cell was heat pressed (load: 20 kg per 1 cm$^2$ of the electrode; temperature: 90° C.; heated for 1 minute after 3 minutes of preheating). The peel strength at the interface between the separator on which the resin film is formed and the positive electrode, and at the interface between the separator on which the resin film is formed and the negative electrode that were obtained were measured by fixing each of the positive electrode and the negative electrode and pulling the separator at an angle of 180° using a TENSILON Universal Testing Instrument (manufactured by A&D Company, Limited). The obtained results of the peel strength measurement is shown in Table 1.

(Production of non-aqueous electrolyte secondary battery and cycle test)

An aqueous solvent slurry (solid concentration: 58 wt. %) was produced in the manner such that the weight ratio of BTR918 (modified natural graphite, manufactured by BTR) to a conductivity promoter (Super P, manufactured by TIMCAL) to PVDF (KF#9100, manufactured by Kureha Corporation) was 90:2:8. The slurry was coated on Cu foil using an 80 μm spacer. Thereafter, the coated foil was dried at 120° C. for 3 hours, and pressed to obtain a negative electrode in which the bulk density of the layer obtained by coating and drying the slurry was 1.5 g/cm$^3$, and the basis weight was 57 g/m$^2$.

The negative electrode and the positive electrode obtained by the method described in the "Production of positive electrode for peel strength measurement" section were connected via the separator. Then, the assembly was impregnated with the electrolyte solution (EC/EMC=3/7, LiPF$_6$ 1.2 M), and sealed in an aluminum pouch using a vacuum sealer.

The obtained assembly was heat pressed (load: 20 kg per 1 cm$^2$ of the electrode; temperature: 90° C.; heated for 1 minute after 3 minutes of preheating) using a hot press to obtain a laminated cell.

Three cycles of charge-discharge cycles including constant current constant voltage charging (charging conditions: 0.1 C and 4.2 V) and cut-off constant current discharging (discharging conditions: 0.1 C and 3V) were performed, and then 100 cycles of charge-discharge cycles including constant current constant voltage charging (charging conditions: 1 C and 4.2 V) and cut-off constant current discharging (discharging conditions: 1 C and 3 V) were performed.

Figure 5:
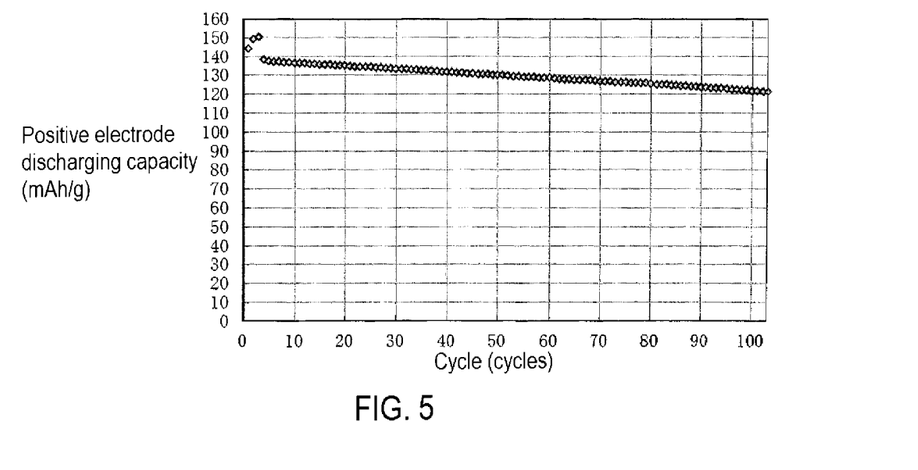
FIG. 5 shows the result of a cycle test of a laminated cell obtained in Working Example 3 of the present invention.

The results are shown in FIG. 5.

Comparative Example 1

In an autoclave with a capacity of 2 L, 1075 g of ion exchanged water, 0.42 g of methylcellulose, 2.9 g of diisopropyl peroxydicarbonate, 378 g of vinylidene fluoride, and 42 g of hexafluoropropylene were charged and polymerized at 29° C. for 10 hours.

After stopping the polymerization, the polymer slurry was heat treated at 95° C. for 60 minutes. Thereafter, the polymer slurry was dewatered, washed with water, and further dried at 80° C. for 20 hours to obtain polymer powder of vinylidene fluoride-hexafluoropropylene copolymer. The inherent viscosity of the obtained polymer was 1.7 dL/g.

In the obtained vinylidene fluoride copolymer, the content of the structural units derived from vinylidene fluoride (mol %) was 96.9 mol %, and the content of the structural units derived from hexafluoropropylene was 3.1 mol %.

(Production of resin film)

A resin film was obtained in the same manner as in Working Example 3 except for using the vinylidene fluoride-hexafluoropropylene copolymer in place of the vinylidene fluoride-hexafluoropropylene-acryloyloxyethyl succinate copolymer. The thickness of the obtained resin film part was approximately 3 μm per side.

The Gurley air permeability of the separator on which the resin film was formed was measured, and the Gurley air permeability was 426 s/100 mL.

(Sample for peel strength measurement and measurement of peel strength)

The peel strength was evaluated in the same manner as in Working Example 3 except for using the separator on which the resin film formed of the vinylidene fluoride-hexafluoropropylene copolymer was used.

The results are shown in Table 1.

Comparative Example 2

(Production of resin film)

A resin film was obtained in the same manner as in Working Example 3 except for using vinylidene fluoride (KF#7200, manufactured by Kureha Corporation) in place of the vinylidene fluoride-hexafluoropropylene-acryloyloxyethyl succinate copolymer.

The Gurley air permeability of the separator on which the resin film was formed was measured, and the Gurley air permeability was 417 s/100 mL.

(Sample for peel strength measurement and measurement of peel strength)

The peel strength was evaluated in the same manner as in Working Example 3 except for using the separator on which the resin film formed of the vinylidene fluoride-hexafluoropropylene copolymer was used.

The results are shown in Table 1.

TABLE 1

|  | Positive electrode | Negative electrode |
|---|---|---|
| Working Example 3 | 2.9 gf/mm | 1.5 gf/mm |
| Comparative Example 1 | 1.8 gf/mm | 0.1 gf/mm |
| Comparative Example 2 | 0.1 gf/mm | 0.1 gf/mm |

As a result of the working examples and comparative examples, the resin film of the invention of the present application can be used as a separator auxiliary layer constituting a non-aqueous electrolyte secondary battery since adhesion to separators, positive electrodes, and negative electrodes is excellent, and movement of ions such as lithium ions are not inhibited.

REFERENCE SIGNS LIST

10 . . . Laminated structure of battery
11 . . . Positive electrode
111 . . . Positive electrode mixture layer
112 . . . Positive electrode current collector
12 . . . Negative electrode
121 . . . Negative electrode mixture layer
122 . . . Negative electrode current collector
13 . . . Separator
14a, 14b . . . Separator auxiliary layer

The invention claimed is:

1. A method for producing a resin film for a non-aqueous electrolyte secondary battery comprising the steps of: coating a separator with a resin composition containing a solvent and a vinylidene fluoride copolymer obtained by copolymerizing vinylidene fluoride and a compound represented by formula (1) below (coating step); and drying the separator on which the resin composition has been coated (drying step):

[Formula 1]

(1)

wherein $R^1$, $R^2$, and $R^3$ are each independently hydrogen atoms, chlorine atoms, or alkyl groups having from 1 to 5 carbons; and X' is an atomic group having a molecular weight of 472 or less and having a main chain configured from 1 to 19 atoms.

2. The method for producing a resin film for a non-aqueous electrolyte secondary battery according to claim 1, wherein the compound represented by formula (1) is a compound represented by formula (2) below:

[Formula 2]

(2)

wherein $R^1$, $R^2$, and $R^3$ are each independently hydrogen atoms, chlorine atoms, or alkyl groups having from 1 to 5 carbons; and X''' is an atomic group having a molecular weight of 456 or less and having a main chain configured from 1 to 18 atoms.

3. The method for producing a resin film for a non-aqueous electrolyte secondary battery according to claim 1, wherein the solvent is a mixed solvent of a good solvent and a poor solvent of the vinylidene fluoride copolymer, wherein the good solvent is at least one solvent selected from group consisting of N-methyl-2-pyrrolidone, N,N-dimethylformamide, N,N-dimethylacetamide, dimethylcarbonate, dimethylsulfoxide, hexamethylphosphoramide, dioxane, propylene carbonate, tetrahydrofuran, tetramethylurea, triethyl phosphate, trimethyl phosphate, acetone, methyl ethyl ketone and cyclohexanone, and the poor solvent is at least one solvent selected from group comprising of water, methanol, ethanol and propanol.

4. The method for producing a resin film for a non-aqueous electrolyte secondary battery according to claim 1, the method further comprising, in between the coating step and the drying step, a step of immersing the separator on which the resin composition has been coated into a poor solvent, wherein the poor solvent is at least one solvent selected from group consisting of water, methanol, ethanol, and propanol.

5. A resin film for a non-aqueous electrolyte secondary battery obtained by the method for producing a resin film for a non-aqueous electrolyte secondary battery described in claim 1.

* * * * *